Patented Oct. 16, 1951

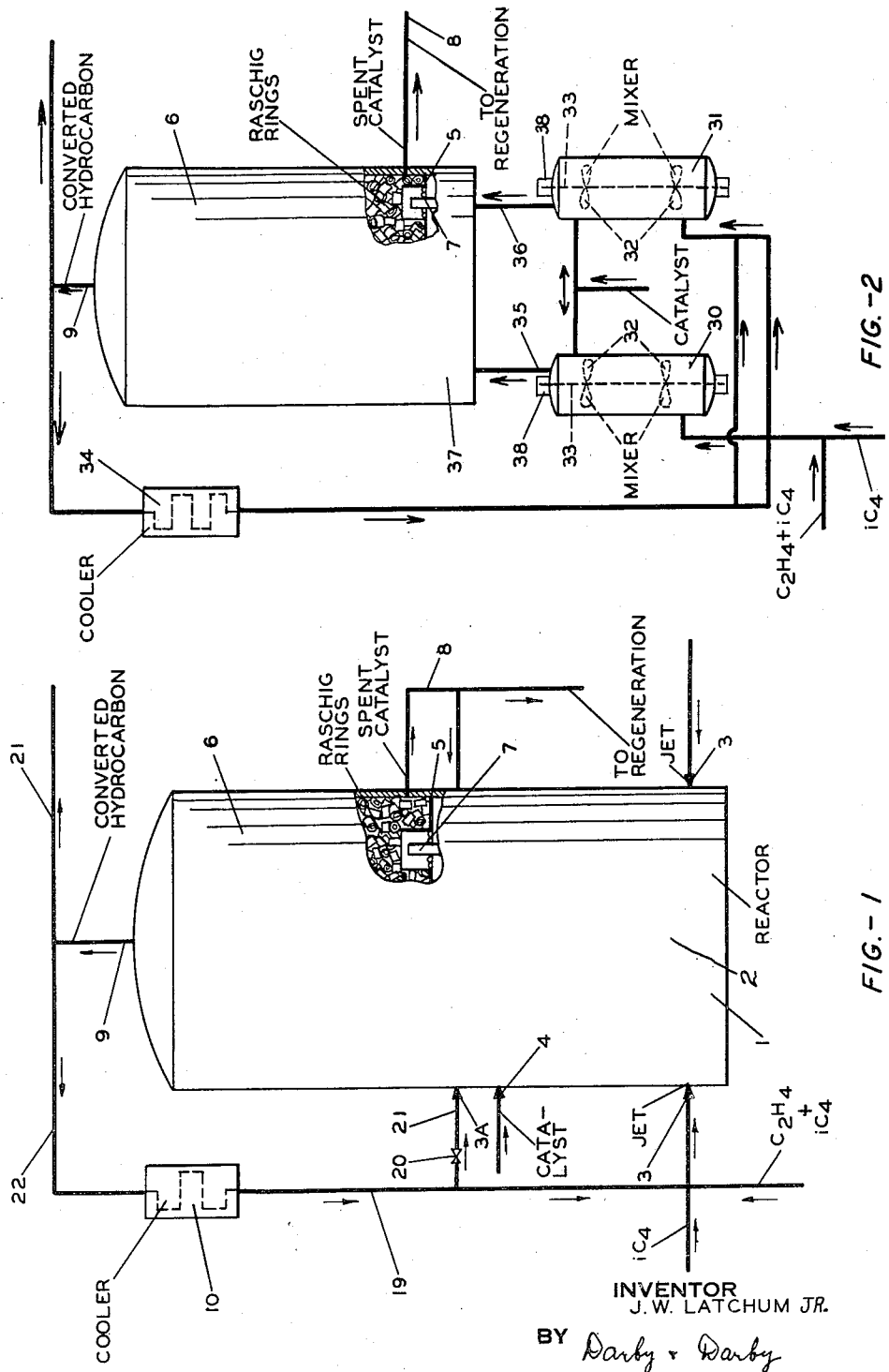

2,571,262

UNITED STATES PATENT OFFICE 2,571,262

METHOD OF HYDROCARBON CONVERSION UTILIZING FRIEDEL-CRAFTS CATALYSTS

John W. Latchum, Jr., Bartlesville, Okla., assignor to Phillips Petroleum Company, a corporation of Delaware Application February 5, 1948, Serial No. 6,450

6 Claims. (Cl. 260—683.4)

This invention relates to an improved method and apparatus for contacting hydrocarbons with a fluid-type catalyst. More specifically, it is concerned with a novel method and apparatus for extending the catalyst life and for removing less active catalyst from a reaction vessel containing more active catalyst.

This application is a continuation in part of my copending application, Serial No. 511,143, filed November 20, 1943, and now abandoned.

In hydrocarbon conversion processes, particularly those catalytic processes using a Friedel-Crafts catalyst complex whereby branched chain paraffinic hydrocarbons are produced or isomerization is effected, it is highly desirable to effect simultaneously conversion and catalyst separation in a single stage maintained under conversion conditions of temperature and pressure. In practicing processes of this type, there are certain important points with respect to the reaction temperature and reaction conditions to which consideration should be given:

(1) The first of these is concerned with the provision for intimate contact between reactants and catalyst, to insure good conversions per pass. The reactor should provide good agitation, with a large interface area in the reactants-catalyst emulsion.

(2) The second point concerns the provision of adequate space to enable the main reaction zone to hold the hydrocarbon-catalyst emulsion. In the particular example chosen for the purpose of illustrating the present invention, this amounts to 200% of the volume occupied by the catalyst alone.

(3) The third point to be considered is the provision for achieving the optimum catalyst life. The removal of catalyst from the reactor is necessary since the catalyst gradually loses its activity and must be replaced.

(4) A fourth point, of particular importance with certain types of catalysts, is the method for providing settling space and means for return of catalyst sludge which may have been carried out of the primary reaction chamber.

(5) A means must be provided for controlling the heat of reaction, which necessitates, in most cases, a method of heat removal.

(6) Mixing, conversion, and separation should be accomplished simultaneously, which eliminates considerable pumping, auxiliary cooling, and auxiliary settling.

It is an object of this invention to provide a method and apparatus in which the aforementioned requirements are fulfilled in a novel and advantageous manner. It is a further object of the invention to provide a reaction chamber in which the alkylation of an isoparaffin with an olefin may be accomplished with a maximum conversion per pass and in which the catalyst life may be extended to the optimum value.

Other objects and advantages will be apparent from the following specification and the accompanying drawings, in which—

Figure 1 is a sectional view of the catalyst chamber showing connections thereto schematically; and Figure 2 is a sectional view of a modification of the catalyst chamber with mechanical mixing devices showing connections thereto schematically.

This invention may be more readily understood by reference to the accompanying diagram, Figure 1, wherein I represents the outer steel shell of the reactor, which, for the purpose of illustration, is represented as being a cylinder sixty feet in height and nine feet four inches in diameter. The numeral 2 designates the space forming the main reaction zone, in which the catalyst-hydrocarbon emulsion is contained, the emulsified state being maintained by means of a plurality of jets 3 through which the reactants are introduced. Catalyst, including makeup, is introduced at 4, a point somewhat below bubble tray 5, which is located about halfway up the reactor. The product, some of the reactants, and dissolved and entrained catalyst pass upward in liquid state through the bubble tray 5 into the space 6 above, which is provided with a suitable packing material such as (1½") Raschig rings. Most of the entrained catalyst is prevented by this packing material from passing on out of the reactor, and the catalyst drains back onto the bubble tray, which is provided with deep chimneys 7. A drawoff line 8 enables the accumulated spent catalyst to be withdrawn at a predetermined rate, depending upon the catalyst life.

The product is passed overhead through line 9 and line 21 to a final settling tank (not shown). A portion is diverted through line 22 and external cooling coils 10 and returned to the reactor through jets 3.

In order to make clearer the particular advantages of the invention, its construction and operation as a reaction chamber will be discussed with reference to the six points indicated above. (1) It will be apparent that the invention is not limited to the use of jets as a means of securing agitation of the hydrocarbon-catalyst mixture. Various kinds of mechanical stirrers may be employed, the important point being that the design of the reactor makes possible a large amount of reactants-catalyst emulsion interface area, thus insuring intimate contact and good conversion per pass. (2) The provision of a relatively large main reaction zone makes possible a rather sharp separation of product phase from catalyst-reactants phase. This occurs in the upper part of the space 2, just below the bubble tray. As a result, the packed space 6 is occupied by the product, with some (entrained and dissolved) catalyst and some unconverted reactants. The denser catalyst-containing material drains back down over the packing, and in so doing provides greater interface area and greater contact time for conversion of the reactants which have reached this region unchanged. It follows that this catalyst will be at a lower level of activity than that in the main reaction zone, and it is, therefore, allowed to accumulate on the bubble tray, from which it may be withdrawn as desired or some returned to the reaction zone. (3) It will be readily seen that this arrangement makes possible the extension of catalyst life to a far greater degree than that attained by previous types of reactors. Heretofore, catalyst has been withdrawn from the reactor proper, and, of necessity, is at the same level of activity as the rest of the catalyst in the reactor. (4). The packed space 6 also provides a preliminary settling chamber, which eliminates sludging of catalyst to the final settler. The sludged catalyst drains back into the reaction zone through the bubble tray, since the drawoff is set at a certain predetermined rate, depending on catalyst life. (5) Heat removal may be accomplished either by external cooling coils, as shown, or by means of coils (not shown) placed within the reactor 2 and packed space 6. (6) This arrangement permits simultaneous mixing, conversion, and separation.

In the alkylation of isobutane with ethylene, for the production of diisopropyl, the catalyst is an aluminum chloride-hydrocarbon complex. This catalyst is a complex or reaction product of aluminum chloride with a hydrocarbon fraction, such as kerosene or heavy alkylate. The complex becomes an active alkylation or conversion catalyst after additional aluminum chloride has been suspended and/or dissolved in the complex. In practicing this invention, a mere solution of aluminum chloride in a solvent—for example, ethyl chloride, which immediately forms a homogeneous mixture with the hydrocarbon phase—is inadequate as the catalyst since finely-divided aluminum chloride becomes precipitated and requires complicated removal stages, such as separate filtration. It is introduced into the reactor at 4, just below the bubble plate 5. The reactants, in a ratio of about 40.7 mols of isobutane to 1 of ethylene, are introduced in the liquid state through jets 3 near the base of the reactor. Reactants enter under pressure of about 450 pounds per square inch and at a temperature of approximately 100° F. Vigorous agitation of the catalyst and reactants results in an emulsion which occupies most of the space below the bubble plate. As pointed out above, a rather sharp break in the emulsion occurs at a point below the bubble plate, and the packed space above is occupied by the product with some entrained and dissolved catalyst and unconverted reactants. It is in this feature that the present invention is particularly advantageous over prior devices, for in this packed section the heavier catalyst drains back down over the packing, exposing a maximum of contacting surface to the unreacted materials, and is collected on the bubble plate at its lowest level of catalytic activity. The location of the drawoff facilitates the removal of the spent catalyst, either continuously or intermittently, so that the maximum catalyst life is attained. Packed contactors have been employed in a somewhat similar manner heretofore, but without the feature that distinguishes the present invention. In U. S. Patent No. 2,146,667 to Atwell, issued February 7, 1937, for instance, there is shown a packed tower in which reactant gases flow upward, countercurrent to a fluid-type catalyst which is withdrawn from the bottom of the tower. No provision is made, however, for regulating the proportion of catalyst withdrawn, whereas in the present invention this important feature is provided for by the bubble plate with its deep chimneys (eight inches) in combination with the means for drawing off a portion of the spent catalyst pool, as described above.

Diisopropyl, and other reaction products, together with unconverted reactants, leave the reactor through line 9 at 370 pounds pressure and at about 125° F. Temperature control is provided by external cooling coils 10, as previously described.

In case it is desired to use a mechanical mixing device instead of jets, the modification shown in Figure 2 may be employed. One or more reactors (30 and 31), equipped with disperser elements 32 on shafts 33, are piped for parallel flow, with provision for introduction of recycled effluent from the coolers 34 and for entry of a portion of the feed into each reactor. Effluents from the reactors pass by way of lines 35 and 36 to the bottom of the primary settler, which corresponds to approximately the top half of the reactor-contactor 1 of Figure 1. The space 37 permits separation of the hydrocarbon phase from catalyst reactants emulsion, and the remainder of the operation is as described previously for the modification shown in Figure 1.

A mechanical mixing device may, of course, be employed in the reaction chamber shown in Figure 1, but in the presence of a corrosive type catalyst, such as aluminum chloride, it is preferred to use one or more separate mixing chambers so that the bearings may be more easily placed out of contact with the catalyst phase. End bearings 38 are so placed in Figure 2, for example.

It is within the scope of this invention to provide means of controlling the amount of catalyst carried up into the packed section 6 without necessarily varying the rate of through-put. This may be done, for example, by providing one or more jets 3A (Figure 1) located just below the bubble plate, so that a portion of the recycled hydrocarbons may be diverted from line 19 through valve 20 and line 21 and jetted into the upper part of the emulsified layer so as to increase the amount of entrained catalyst entering the upper section 6. Other means of accomplishing the same result include providing more vigorous agitation so as to bring the emulsion nearer the bubble plate, decreasing the size of the openings in the bubble plate so as to increase the rate of flow through them, and lowering the position of the bubble plate in the reactor.

What is claimed is:

1. In a catalytic conversion process utilizing a Friedel-Crafts type of catalyst complex, comprising the steps of contacting the hydrocarbon reactants with a Friedel-Crafts type of catalyst complex under conversion temperature and pressure conditions, the improvement comprising effecting mixing of the reactants and catalyst, conversion of the hydrocarbons and separation of the reaction mixture including reaction products from the catalyst characterized by continuously withdrawing a portion of the reaction mixture, passing said portion into a body of packing material to deposit the catalyst thereon, passing the hydrocarbons partially freed of catalyst through the packing material to effect separation of the catalyst from the hydrocarbons, returning the catalyst over the packing material countercurrent to the flow of reaction mixture while maintaining reaction temperature and pressure conditions in the packing material zone collecting the catalyst in a body at the bottom of the body of packing material and withdrawing the spent catalyst from said body of catalyst.

2. In a hydrocarbon conversion process utilizing a Friedel-Crafts type of catalyst complex comprising the steps of contacting the hydrocarbon reactants with a Friedel-Crafts type of catalyst complex in a reactor having two reaction zones under conversion temperature and pressure conditions, the improvement comprising effecting mixing of the reactants and catalyst, conversion of the hydrocarbons, and separation of the reaction mixture including reaction products from the catalyst characterized by continuously withdrawing a portion of the reaction mixture from the first zone, simultaneously effecting further conversion of the hydrocarbons and deposition of the catalyst in the second reaction zone, passing the hydrocarbons partially freed of catalyst through packing material to effect further separation of the catalyst from the hydrocarbons within the second reaction zone, and returning the catalyst over the packing material countercurrent to the flow of reaction mixture while maintaining reaction temperature and pressure conditions in the second zone and removing the reaction products from the second reaction zone substantially freed of catalyst.

3. In an alkylation process comprising the steps of contacting an isoparaffin and an olefin hydrocarbon with an aluminum chloride-hydrocarbon complex catalyst under alkylation temperature and pressure conditions in a reaction zone, the improvement comprising vigorously agitating the mixture to produce thorough contact between all of the reactants, continuously withdrawing from the top of the mixture a portion comprising unreacted hydrocarbons, alkylate and catalyst, passing said portion into a body of packing material to deposit the catalyst thereon while passing the hydrocarbons through the packing material to effect separation of the catalyst therefrom, returning the catalyst over the packing material countercurrent to the flow of reaction mixture while maintaining alkylation temperature and pressure conditions in the packing material zone and withdrawing the catalyst from the bottom of said body of packing material.

4. In the method of claim 3, the steps of collecting the returning catalyst in a body at the bottom of said packing material and withdrawing catalyst from the process from this body.

5. In a hydrocarbon conversion process comprising the steps of contacting an isoparaffin and an olefin with an activated aluminum chloride hydrocarbon complex catalyst in liquid phase in a reaction zone maintained under alkylation conditions for such hydrocarbons, the improvement comprising inducing intimate mixing under pressure of the reactants and passing a portion of the mixture comprising alkylate, unreacted hydrocarbons and catalyst upwardly into a packed reaction zone maintained under alkylation conditions to effect additional and further alkylation reaction between the hydrocarbons to further expend the catalyst while simultaneously separating the catalyst from the hydrocarbon materials comprising alkylate and unreacted hydrocarbons, withdrawing hydrocarbons from said packed reaction zone substantially free of catalyst, cooling a portion of said withdrawn hydrocarbons, recycling the cooled portion to said first reaction zone, and withdrawing from the lower part of said packed reaction zone aluminum chloride hydrocarbon complex having lower activity than the catalyst in said first reaction zone.

6. In the method of claim 5, said isoparaffin being isobutane and said olefin being ethylene.

JOHN W. LATCHUM, JR.

REFERENCES CITED

The following references are of record in the file of this patent:

UNITED STATES PATENTS

| Number | Name | Date |
|---|---|---|
| 1,730,891 | Leslie et al. | Oct. 8, 1929 |
| 2,221,799 | Ittner | Nov. 19, 1940 |
| 2,338,248 | Kassel | Jan. 4, 1944 |
| 2,363,264 | Rosen | Nov. 21, 1944 |
| 2,407,311 | Lynch et al. | Sept. 10, 1946 |
| 2,437,394 | Legatski | Mar. 9, 1948 |